(12) United States Patent
Williams et al.

(10) Patent No.: US 9,379,913 B2
(45) Date of Patent: *Jun. 28, 2016

(54) SYSTEM AND METHOD FOR ACHIEVING ACCELERATED THROUGHPUT

(75) Inventors: Matthew Robert Williams, Kanata (CA); Jonathan N. Cressman, Ottawa (CA)

(73) Assignee: LiveQoS Inc., Ottawa (CA)

( * ) Notice: Subject to any disclaimer, the term of this patent is extended or adjusted under 35 U.S.C. 154(b) by 506 days.

This patent is subject to a terminal disclaimer.

(21) Appl. No.: 12/959,944

(22) Filed: Dec. 3, 2010

(65) Prior Publication Data

US 2011/0103388 A1 May 5, 2011

Related U.S. Application Data

(63) Continuation of application No. 12/193,345, filed on Aug. 18, 2008, now Pat. No. 8,009,696, which is a continuation-in-part of application No. 10/912,200, filed on Aug. 6, 2004, now Pat. No. 7,742,501.

(51) Int. Cl.
*H04J 3/22* (2006.01)
*H04L 12/64* (2006.01)
(Continued)

(52) U.S. Cl.
CPC .......... *H04L 12/6418* (2013.01); *H04L 1/0041* (2013.01); *H04L 1/0068* (2013.01);
(Continued)

(58) Field of Classification Search
CPC ................... H04L 1/00; H04L 1/0001; H04L 1/0006–1/0009; H04L 1/004–1/0041

USPC .................................................. 370/310–350
See application file for complete search history.

(56) References Cited

U.S. PATENT DOCUMENTS

| | | | |
|---|---|---|---|
| 4,908,827 | A | 3/1990 | Gates |
| 5,600,663 | A | 2/1997 | Ayanoglu et al. |

(Continued)

FOREIGN PATENT DOCUMENTS

| | | |
|---|---|---|
| CA | 2450563 | 12/2002 |
| CN | 1343410 | 4/2002 |

(Continued)

OTHER PUBLICATIONS

International Search Report, PCT/IB2011/050917, mailed Jun. 22, 2011 (3 pages).

(Continued)

*Primary Examiner* — Andrew Chriss
*Assistant Examiner* — Kenan Cehic
(74) *Attorney, Agent, or Firm* — Nixon Peabody LLP

(57) ABSTRACT

Systems and methods for transporting data between two endpoints over an encoded channel are disclosed. Data transmission units (data units) from the source network are received at an encoding component logically located between the endpoints. These first data units are subdivided into second data units and are transmitted to the destination network over the transport network. Also transmitted are encoded or extra second data units that allow the original first data units to be recreated even if some of the second data units are lost. These encoded second data units may be merely copies of the second data units transmitted, parity second data units, or second data units which have been encoded using erasure correcting coding. At the receiving endpoint, the second data units are received and are used to recreate the original first data units.

28 Claims, 8 Drawing Sheets

(51) Int. Cl.
*H04L 1/00* (2006.01)
*H04L 1/08* (2006.01)
*H04L 1/18* (2006.01)

(52) U.S. Cl.
CPC ............... *H04L1/0072* (2013.01); *H04L 1/08* (2013.01); *H04L 1/0057* (2013.01); *H04L 1/0071* (2013.01); *H04L 1/1809* (2013.01); *H04L 1/1812* (2013.01); *H04L 2001/0097* (2013.01)

(56) References Cited

U.S. PATENT DOCUMENTS

| | | | |
|---|---|---|---|
| 5,677,918 A | 10/1997 | Tran et al. | |
| 5,751,970 A | 5/1998 | Bournas | |
| 5,857,072 A | 1/1999 | Crowle | |
| 6,000,053 A | 12/1999 | Levine et al. | |
| 6,012,159 A | 1/2000 | Fischer et al. | |
| 6,126,310 A | 10/2000 | Osthoff et al. | |
| 6,172,972 B1 | 1/2001 | Birdwell et al. | |
| 6,272,148 B1 | 8/2001 | Takagi et al. | |
| 6,272,658 B1 | 8/2001 | Steele et al. | |
| 6,278,716 B1 | 8/2001 | Rubenstein et al. | |
| 6,336,200 B1 | 1/2002 | Wolfgang | |
| 6,421,387 B1 | 7/2002 | Rhee | |
| 6,421,805 B1 | 7/2002 | McAuliffe | |
| 6,438,108 B1 | 8/2002 | Kanljung et al. | |
| 6,445,717 B1 | 9/2002 | Gibson et al. | |
| 6,449,251 B1 | 9/2002 | Awadallah et al. | |
| 6,529,552 B1 * | 3/2003 | Tsai et al. | 375/240.05 |
| 6,570,843 B1 | 5/2003 | Wolfgang | |
| 6,606,723 B2 | 8/2003 | Wolfgang | |
| 6,609,223 B1 | 8/2003 | Wolfgang | |
| 6,728,924 B1 | 4/2004 | Lou et al. | |
| 6,744,766 B2 | 6/2004 | Alapuranen | |
| 6,868,083 B2 | 3/2005 | Apostolopoulos et al. | |
| 6,876,669 B2 | 4/2005 | Shalom | |
| 6,901,051 B1 | 5/2005 | Hou et al. | |
| 7,016,409 B2 | 3/2006 | Unger | |
| 7,024,609 B2 | 4/2006 | Wolfgang et al. | |
| 7,035,217 B1 * | 4/2006 | Vicisano et al. | 370/236 |
| 7,050,396 B1 * | 5/2006 | Cohen et al. | 370/235 |
| 7,065,482 B2 | 6/2006 | Shorey et al. | |
| 7,075,936 B2 | 7/2006 | Hathaway et al. | |
| 7,089,478 B2 | 8/2006 | Cummings et al. | |
| 7,133,407 B2 | 11/2006 | Jinzaki et al. | |
| 7,167,704 B2 | 1/2007 | Chang | |
| 7,215,683 B2 | 5/2007 | Burkert et al. | |
| 7,236,481 B2 | 6/2007 | Kim | |
| 7,310,670 B1 | 12/2007 | Walbeck et al. | |
| 7,319,701 B2 | 1/2008 | Guven | |
| 7,522,606 B1 | 4/2009 | Sendrovitz | |
| 7,609,716 B2 | 10/2009 | Brown et al. | |
| 7,720,063 B2 | 5/2010 | Maiorana et al. | |
| 7,739,398 B1 * | 6/2010 | Shabtay | 709/232 |
| 7,742,501 B2 | 6/2010 | Williams | |
| 7,801,044 B2 | 9/2010 | Moutarlier | |
| 7,821,937 B1 | 10/2010 | Guo | |
| 7,889,654 B2 | 2/2011 | Ramakrishnan et al. | |
| 7,936,785 B2 | 5/2011 | Ehret et al. | |
| 7,953,114 B2 | 5/2011 | Williams et al. | |
| 8,009,696 B2 | 8/2011 | Williams et al. | |
| 8,045,563 B2 | 10/2011 | Lee | |
| 8,437,370 B2 | 5/2013 | Williams et al. | |
| 2001/0009547 A1 | 7/2001 | Jinzaki et al. | |
| 2001/0040883 A1 | 11/2001 | Chang et al. | |
| 2002/0061059 A1 | 5/2002 | Ginesi | |
| 2002/0141448 A1 | 10/2002 | Matsunaga | |
| 2002/0146016 A1 | 10/2002 | Liu et al. | |
| 2002/0154631 A1 | 10/2002 | Makansi et al. | |
| 2002/0164024 A1 * | 11/2002 | Arakawa et al. | 380/210 |
| 2003/0002499 A1 * | 1/2003 | Cummings et al. | 370/389 |
| 2003/0018793 A1 * | 1/2003 | Mora | 709/230 |
| 2003/0035440 A1 | 2/2003 | Casaccia et al. | |
| 2003/0053461 A1 | 3/2003 | Ross | |
| 2003/0105997 A1 | 6/2003 | Mitlin | |
| 2003/0108044 A1 * | 6/2003 | Hendel | 370/392 |
| 2003/0152058 A1 * | 8/2003 | Cimini et al. | 370/338 |
| 2003/0219034 A1 | 11/2003 | Lotter et al. | |
| 2004/0010736 A1 | 1/2004 | Alapuranin | |
| 2004/0015686 A1 | 1/2004 | Connor et al. | |
| 2004/0039827 A1 * | 2/2004 | Thomas et al. | 709/228 |
| 2004/0095885 A1 | 5/2004 | Yang | |
| 2004/0160943 A1 | 8/2004 | Cain | |
| 2004/0196785 A1 | 10/2004 | Janakiraman et al. | |
| 2004/0213197 A1 | 10/2004 | Zimmerman et al. | |
| 2004/0264396 A1 | 12/2004 | Ginzburg et al. | |
| 2004/0267945 A1 | 12/2004 | Reiss | |
| 2005/0025185 A1 | 2/2005 | Brown et al. | |
| 2005/0053002 A1 | 3/2005 | Chan et al. | |
| 2005/0130646 A1 | 6/2005 | Frank et al. | |
| 2005/0195859 A1 | 9/2005 | Mahany | |
| 2005/0213586 A1 | 9/2005 | Cyganski et al. | |
| 2005/0259577 A1 | 11/2005 | Sin | |
| 2006/0018315 A1 * | 1/2006 | Baratakke et al. | 370/389 |
| 2006/0029101 A1 | 2/2006 | Williams | 370/474 |
| 2006/0031518 A1 * | 2/2006 | Jennings, III | 709/227 |
| 2006/0031847 A1 | 2/2006 | Macdonald et al. | |
| 2006/0106598 A1 | 5/2006 | Trombetta et al. | |
| 2006/0165163 A1 | 7/2006 | Burazerovic et al. | |
| 2006/0178143 A1 | 8/2006 | Chang et al. | |
| 2006/0210037 A1 | 9/2006 | Olafsson | |
| 2006/0245384 A1 | 11/2006 | Talukdar et al. | |
| 2006/0268717 A1 | 11/2006 | Kanterakis | |
| 2007/0011321 A1 | 1/2007 | Huntington et al. | |
| 2007/0076680 A1 | 4/2007 | Amram et al. | |
| 2007/0116052 A1 | 5/2007 | Yu et al. | |
| 2007/0157060 A1 * | 7/2007 | Ganga et al. | 714/752 |
| 2007/0177739 A1 | 8/2007 | Ganguly et al. | |
| 2008/0089268 A1 | 4/2008 | Kinder et al. | |
| 2008/0095247 A1 | 4/2008 | Ohno et al. | 375/240 |
| 2008/0151776 A1 | 6/2008 | Kure | |
| 2008/0151823 A1 | 6/2008 | Quigley | |
| 2008/0240108 A1 | 10/2008 | Hyldgaard | |
| 2008/0304483 A1 | 12/2008 | Williams et al. | |
| 2009/0006920 A1 | 1/2009 | Munson et al. | |
| 2009/0049189 A1 | 2/2009 | Zhu et al. | |
| 2009/0116487 A1 * | 5/2009 | Read | 370/392 |
| 2009/0135950 A1 * | 5/2009 | Hoffmann et al. | 375/298 |
| 2009/0268742 A1 | 10/2009 | Hama | |
| 2009/0268747 A1 | 10/2009 | Kurata et al. | |
| 2010/0005177 A1 * | 1/2010 | Cagenius | 709/228 |
| 2010/0023842 A1 | 1/2010 | Rahrer et al. | |
| 2010/0080167 A1 | 4/2010 | Cordeiro | |
| 2010/0272122 A1 | 10/2010 | Williams et al. | |
| 2011/0044338 A1 | 2/2011 | Stahl et al. | |
| 2011/0206043 A1 | 8/2011 | Williams et al. | |
| 2012/0201136 A1 | 8/2012 | Williams et al. | |
| 2012/0203893 A1 | 8/2012 | Williams et al. | |
| 2012/0213232 A1 | 8/2012 | Williams et al. | |
| 2012/0287806 A1 | 11/2012 | Williams | |
| 2013/0124682 A1 | 5/2013 | Williams et al. | |

FOREIGN PATENT DOCUMENTS

| | | |
|---|---|---|
| EP | 1049299 | 11/2000 |
| EP | 1 755 248 | 2/2007 |
| JP | 10-119426 | 5/1998 |
| JP | 10-174069 | 6/1998 |
| JP | 11-225161 | 8/1999 |
| JP | 2000-151623 | 5/2000 |
| JP | 2001-119426 | 4/2001 |
| JP | 2001-345854 | 12/2001 |
| JP | 2002-077258 | 3/2002 |
| JP | 2002-290459 | 10/2002 |
| JP | 2003-196618 | 7/2003 |
| JP | 2003-198618 | 7/2003 |
| JP | 2003-298560 | 10/2003 |
| JP | 2004-187286 | 7/2004 |
| JP | 2005-287016 | 10/2005 |
| JP | 2007-184836 | 7/2007 |
| JP | 2008-509580 | 3/2008 |
| JP | 2008-153778 | 7/2008 |

(56) References Cited

FOREIGN PATENT DOCUMENTS

| WO | 98/20511 | 5/1998 |
| WO | 00/48366 | 8/2000 |
| WO | 2009/020876 | 2/2009 |

OTHER PUBLICATIONS

International Written Opinion, PCT/IB2011/050917, mailed Jun. 22, 2011 (4 pages).
European Patent Application No. 09167948.0 Search Report, dated Nov. 26, 2009 (5 pages).
Barakat, C.; Simulation-Based Study of link level Hybrid FEC/ARQ-SR for Wireless Links and Long-Lived TCP Traffic, INRIA Research Report RR-4752; Feb. 2003 (8 pages).
International Search Report, PCT/CA2005/001206, mailed Jun. 22, 2011 (2 pages).
International Written Opinion, PCT/CA2005/001206, mailed Jun. 22, 2011 (6 pages).
Japanese Patent Application No. 2007-524146, Office Action dated Sep. 28, 2010 (9 pages).
European Patent Application No. 12181248.1 Search Report, dated Sep. 10, 2012 (6 pages).
International Search Report, PCT/IB2012/050473, mailed Aug. 24, 2012 (3 pages).
International Written Opinion, PCT/IB2012/050473, mailed Aug. 24, 2012 (6 pages).
Notice of Allowance issued in U.S. Appl. No. 10/912,200, dated Mar. 1, 2010 (4 pages).
European Search Report mailed Sep. 2, 2013 which issued in European Patent Application No. 13177433.3 (5 pages).
Pfaffenberger, B. "Central Processing Unit." Webster's New World Computer Dictionary. Ninth Edition. New York: Hungry Minds, Inc., 2001.
Border, J. et al. "Performance Enhancing Proxies Intended to Mitigate Link-Related Degradations." Network Working Group—Category: Informational. Jun. 1, 2001 (46 pages).
Mahy, R. et al. "Traversal Using Relays Around NAT (TURN): Relay Extensions to Session Traversal Utilities for NAT (STUN)." Internet Engineering Task Force (IETF)—Category: Standards Track. Apr. 29, 2010 (68 pages).
Extended European Search Report mailed Jun. 26, 2014 which issued in European Patent Application No. 12744550.0 (5 pages).
Extended European Search Report mailed May 14, 2014 which issued in European Patent Application No. 14150050.4 (7 pages).

\* cited by examiner

SYSTEM AND METHOD FOR ACHIEVING ACCELERATED THROUGHPUT

CROSS REFERENCE TO RELATED APPLICATIONS

This application is a continuation of U.S. patent application No. 12/193,345, filed Aug. 18, 2008, which is a continuation-in-part of U.S. patent application No. 10/912,200, filed Aug. 6, 2004, now U.S. Pat. No. 7,742,501, all of which are hereby incorporated by reference in their entirety.

FIELD OF THE INVENTION

The present invention relates to communication data networks. More specifically, the present invention relates to systems and methods for increasing the throughput of data transmissions through a transport network as seen from the edge of the transport network.

BACKGROUND OF THE INVENTION

Most, if not all, transport networks are packet based networks that break up data streams into smaller packets of data which are then transmitted from a first source network, or endpoint, to a third destination network, or endpoint, via a second transport network. However, due to congestion and other network limitations, not all packets successfully arrive at the destination network. What matters to the source and end destination networks is the performance of the transport network. The transport network must, from the point of view of the applications at the end networks, ideally be perfect with no lost packets. However, it would be preferred if such performance could be had for a price lower than the usual costs of leasing high performance transport networks.

Accordingly, there is a need for systems and methods, which can be used with low cost communications transport networks to provide end network applications with a high performance view of the transport network.

Approaches have been tried to address the above situation. In one approach, custom protocol stacks are installed at the endpoints to improve the response to loss and latency. However, this approach requires that both end networks communicate according to the same custom protocol, which generally requires extensive reprogramming.

Another approach uses network elements that intercept standard protocols and send protocol responses on behalf of a far-end element. Custom protocols are then used between the intercepting network elements. This approach is limited to TCP/IP applications and adds complexity, especially in regards to troubleshooting network problems.

SUMMARY OF THE INVENTION

In a first aspect, there is provided a method of accelerating data communications over an unreliable network. The method comprises providing encoding components associated with each of two endpoints to a communication. An encoded channel between the respective encoding components is then established for a communication session between the endpoints. A data packet related to the communication session is then intercepted at one of the encoding components. The data packet is segmented and marked to provide encoded data segments for transmission to the other of the encoding components. The encoded data segments and at least one extra segment are then transmitted to the other of the encoding components over the encoded channel, where they are decoded and reassembled to recreate the data packet. The reassembled data packet is then transmitted from the other of the encoding components to its respective endpoint. The encoded channel can be torn down if no further packets are transmitted within a predetermined timeout period.

According to an embodiment, establishing the encoded channel can comprise detecting a message originating from one of the two endpoints and destined to the other of the two endpoints; storing information uniquely identifying the communication session; detecting a reply to the message, and matching it to the previously stored information identifying the communication session; intercepting the reply; marking the reply to indicate that the endpoint replying to the message is enabled to segment and encode data packets according to a protocol known to both encoding components; forwarding the marked reply to the endpoint originating the message; and exchanging control messages to establish an encoded channel between the encoding components.

According to another embodiment, establishing the encoded channel comprises detecting a message originating from one of the two endpoints and destined to the other of the two endpoints; storing information uniquely identifying the communication session; detecting a reply to the message, and matching it to previously stored information identifying the communication session; intercepting the reply prior to delivery to the endpoint originating the message; determining if the reply has been marked to indicate that the endpoint replying to the message is enabled to segment and encode data packets according to a protocol known to both encoding components; and transmitting control messages to establish an encoded channel between the encoding components. Marking the reply can comprise setting an option in an IP header, or setting an identification field to a known value.

In yet another embodiment, establishing the encoded channel comprises detecting control messages within one communication session that establish a related communication between the two endpoints according to a known protocol, the control messages including an identification of the related communication sessions's originating and destination ports; and creating an encoded channel in response to the detected control messages. Intercepting the control messages can, for example, comprise applying deep packet analysis to the control message. This embodiment can be used, for example, for RTSP and H.323 communications.

Segmenting and packaging the data packet can comprise segmenting the data packet into data segments in accordance with a predetermined encoding rate, or segmenting the data packet into data segments in accordance with a dynamically adjusted encoding rate. The dynamically adjusted encoding rate can be determined by monitoring loss rates for each of a plurality of communication sessions; determining an average loss rate in accordance with the loss rates of each communication session; communicating a loss rate of the communication session and the average loss rate to the other of the two endpoints to permit the other of the two endpoints to adjust its encoding rate. Segmenting and packaging the data packet can further comprise modifying a header of the data packet and appending modified headers to each of the encoded data segments. Modifying the headers can comprise, for example, modifying a sequence number of a TCP header. Identifying information, such as a serial number, for each segment derived from a given data packet can also be added to each segment.

In a further aspect, there is provided a method of setting an encoding rate for encoding data for accelerated data communication across an unreliable network. The method comprises establishing an encoded channel for each of a plurality of communication sessions, and monitoring loss rates of each communication session. An average loss rate is also determined in accordance with the loss rates of each communication session. The loss rate of a communication session and the average loss rate are communicated to a respective endpoint to permit the endpoint to adjust its encoding rate to reduce its respective loss rate. Monitoring the loss rates can comprise observing loss rates, and receiving reported loss rates.

A further aspect provides a method for streaming video or audio data, or for encoding unidirectional communication sessions, such as over Real-Time Streaming Protocol (RTSP) or between H.323 endpoints. The method comprises providing encoding components at a client and at a server. A message destined to a default port is detected at the encoding components, and parsed using deep packet analysis to determine a session identification for the message. A reply to the message is then detected at the encoding components, and parsed to determine communication ports allocated for use in respect of the communication session. Subsequent data packets are then inspected to determine their originating and destination ports. Each data packet having originating and destination ports that match the allocated communication ports is segmented and marked to provide encoded data segments for transmission to the client. The data packet is decoded and reassembled, based on the received encoded data segments at the encoding component associated with the client. In an embodiment, the deep packet analysis can be achieved using a regex function.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
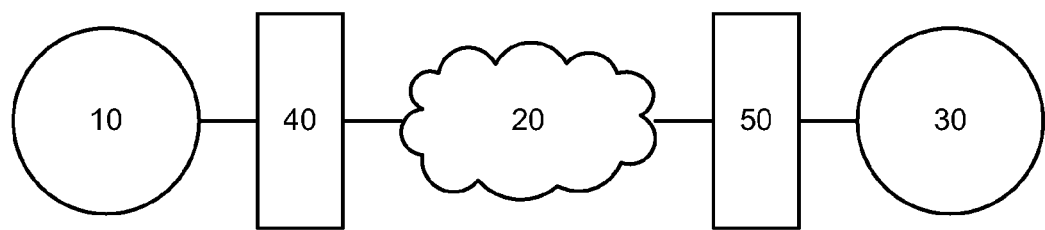
FIG. 1 is a block diagram of an environment in which the invention may be practiced.

Referring to FIG. 1, a block diagram of an environment in which the invention may be practiced is illustrated. A first endpoint 10 communicates, through a network 20, with a second endpoint 30. The first endpoint 10 and the network 20 communicate through an encoding/decoding component 40, while the network 20 communicates with the second endpoint 30 through an encoding/decoding component 50. The encoding/decoding components 40 and 50, hereafter referred to as encoding components, can be resident at the endpoints, or in an intermediate device, such as a server. The first and second endpoints 10 and 30 can be terminals, such as personal computers connected through a modem, local or wide-area networks, or other devices or systems having access to the network 20. The network 20 can be, for example, the Internet or other communications network.

As used herein, a data unit is any unit of data that can be used to transmit data digitally over a network. Such data units can take the form of packets, cells, frames, or any other such units, provided the data is encapsulated within the unit, or carried as a payload. The term data unit is applicable to any and all packets and frames that implement specific protocols, standards, or transmission schemes. Typically, a header, carrying routing, control and identification information, is added to the data payload.

The present system provides a means for insulating the endpoints from the vagaries of the network 20. The encoding components 40 and 50 are provided with means to insulate the endpoints 10 and 30 from the network 20 by handling the encoding and decoding of data units, and their transmission through the network 20. The endpoints 10 and 30 can communicate using any protocol, as can the encoding components 40 and 50. The encoding components 40 and 50 receive original data units in one protocol from the endpoints 10 and 30, and encode the original data units by subdividing them into preferably smaller data units, creating extra data units that can be used to recreate or reconstruct the original data units in the event that some of the data units transmitted through the transport network are lost, and repackaging the subdivided and extra data units according to the present protocol prior to transmitting them through the transport network.

Once the data units transmitted through the transport network 20 are received at the encoding component associated with the far endpoint, the original data units from the originating endpoint are recreated or reconstructed. This recreation or reconstruction can be done by reordering the received data units, if necessary, and, if some data units were lost during transmission, using the extra data units to recreate missing data units. In the event the extra data units received are insufficient to recreate the original data units, the receiving encoding component can optionally request a re-transmission of the data units previously sent.

For ease of explanation, data units originating from or received at the endpoints will be referred to as first data units, or packets, and as being of a first type of data unit. Data units being transmitted across and/or received from the transport network will be referred to as second data units, or segments and as being of a second type of data unit. The second data units are also referred to as encoded data units.

Figure 2:
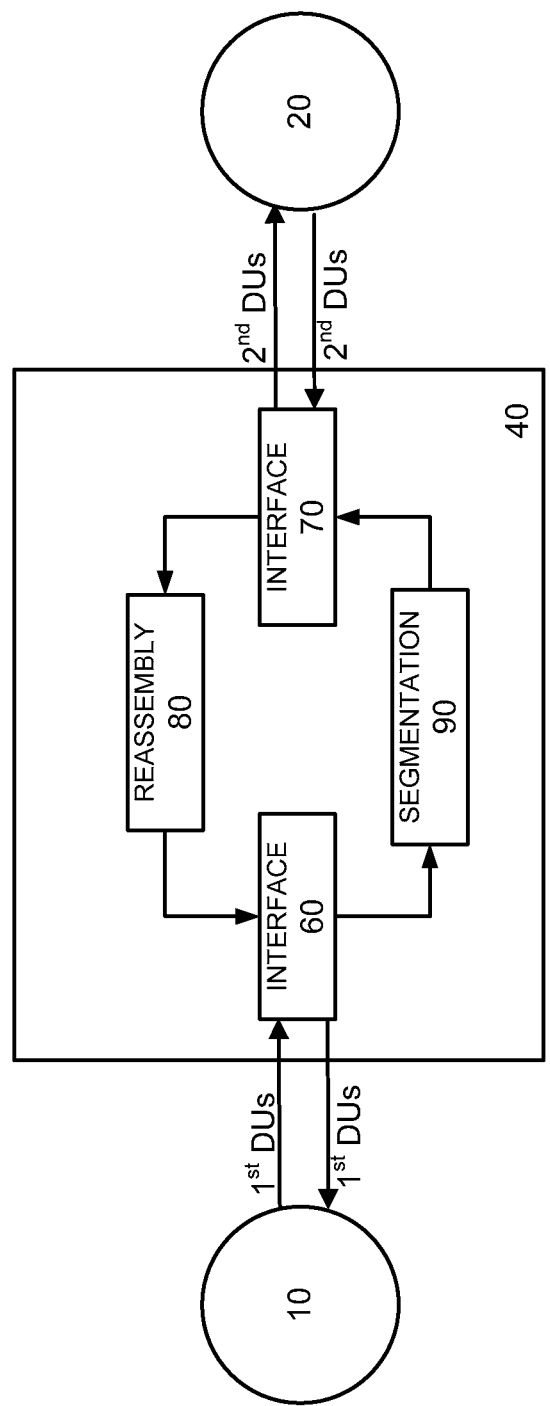
FIG. 2 is a block diagram illustrating the components in a server used in FIG.

FIG. 2 shows an exemplary embodiment of modules necessary to implement the present invention within encoding component 40, and their respective data flows. The modules can be resident in a single device, or can be distributed amongst several devices. As can be seen, encoding component 40 has a first interface 60, a second interface 70, a reassembly module 80, and a segmentation module 90. The first interface 60 sends and receives first data units to and from an endpoint 10. The second interface 70 of the server 40 sends and receives second data units to and from the transport network 20.

The reassembly module 80 receives second data units from the second interface 70 and produces first data units for transmission to the first network 10 by way of the first interface 60. The segmentation module 90, on the other hand, receives first data units from the first interface 60 and produces second data units for transmission to the transport network 20 by way of the second interface 70.

Figure 3:
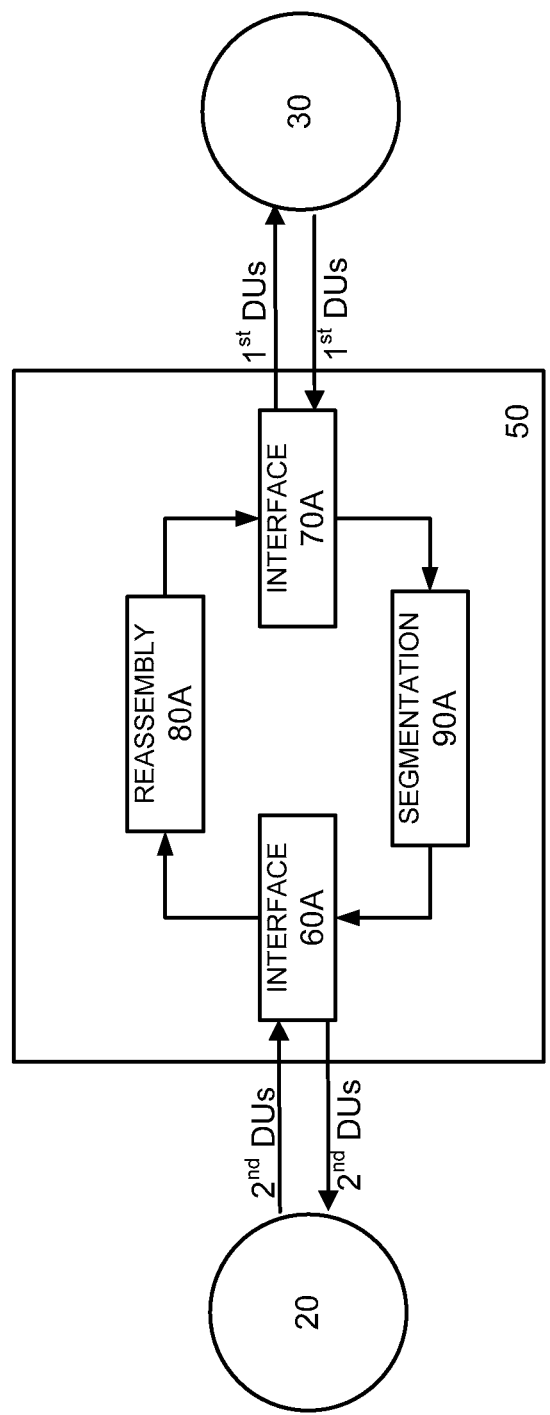
FIG. 3 is a block diagram illustrating the components in another server used in FIG. 1.

Once the second data units have been transmitted through the transport network, they are received by the encoding component at the other endpoint. To illustrate this, FIG. 3 illustrates an exemplary embodiment of the modules and data flow of encoding component 50, which communicates with the transport network and endpoint 30.

The modules in the encoding component 50 are the same as those in encoding component 40 and, in fact, have the same functions. The second interface 70A in encoding component 50 also communicates with the transport network and sends and receives second data units. The first interface 60A also communicates with an endpoint (in this case the endpoint 30) and sends and receives first data units. The reassembly module 80A receives second data units and produces first data units while the segmentation module 90A receives first data units and produces second data units.

As noted above, first data units are the data units used by the end networks, while second data units are used by the transport network and the encoding components 40, 50 when transmitting data to and from each other. The second data units are derived from the first data units. The payload of the first data units can be divided into smaller units and each smaller unit can be the payload in a second data unit. As such, each second data unit can be smaller than the original first data unit from which it was derived. As an example, a 10 kB first data unit may be subdivided into five 2 kB units. These may be the payload of five second data units, each of which may be smaller than 10 kB. This function of creating second data units from first data units is accomplished by the segmentation modules 90, 90A.

To assist in recreating the original first data unit from which the second data units were derived from, the segmentation module also creates extra second data units. These extra second data units can be derived from the first and second data units. The extra second data units assist the reassembly modules 80, 80A in recreating or reassembling the original first data unit in the event one or more second data units are lost during their transmission through the transport network.

The extra second data units can take many forms. In perhaps the simplest embodiment, the extra second data units are merely copies of selected second data units previously sent. As an example, if a first data unit is divided or segmented into four second data units (e.g. DU1, DU2, DU3, DU4), then the extra second data units could be copies of DU2 and DU3. As such, if DU2 or DU3 are lost during the transmission, then the original first data unit can still be recreated. The number and identification of the second data units that are duplicated can be predetermined, or left to the discretion of the system administrator. More redundancy can be built in to the system by including more duplicate second data units, or vice versa for less redundancy, depending on the actual or expected degree of loss in the network 20. In the simplest case, all the second data units can be duplicated to ensure that, in essence, two copies of each second data unit are sent to the destination encoding component.

Parity data units can also be used as the second extra data units. As is well known in the art, a parity data unit can be created using the XOR function. The bits of the different second data units created from the original first data unit can be XOR'd to result in bit values which can be stored in an extra second data unit. If any one of the second data units (not including the extra second data unit) is lost during transmission, the other received second data units and the extra second data unit can be used to recreate the lost second data unit. Performing an XOR function on the received second data units and the extra second data unit will recreate the missing second data unit.

It should be noted that the extra second data units may be encoded using other erasure correcting codes. As an example, if n second data units are generated for a single first data unit, m extra second data units may be generated to allow the lost second data units to be recreated. As noted above, the m extra second data units may be viewed as "redundant" second data units and, if mere duplication is used, m≤n with complete duplication being achieved at m=n. However, if erasure correcting codes are used, with m=2, it is possible to encode the redundant information in such a way that any two second data units can be lost and the reassembly modules can still reconstruct the lost second data units. Well-known methods and coding techniques such as Reed-Solomon, Forward Erasure Correction techniques, and Bose-Chaudhuri-Hochquenghem (BCH) codes, and a multitude of others may be used.

While the extra second data units should assist in counter-acting the effects of losing some second data units, losing too many second data units cannot be completely compensated for. As such, losing a number of second data units past a threshold level can optionally cause the reassembly modules to request a re-transmission of a package or group of second data units. As an example, if the extra second data units can recover from a 25% loss of data units and there are four second data units generated from a single first data unit, then the loss of a single second data unit would not trigger a re-transmission request. However, with the loss of two second data units (i.e. a 50% loss) the reassembly module could request a re-transmission. If re-transmission is enabled, the re-transmission threshold is ideally related to the error or loss-correcting capability of the coding used for the extra or redundant second data units. The reassembly modules can keep track of the number of second data units received for each first data unit that has been segmented, as the reassembly modules will need to properly sequence the payloads of the second data units.

As can be noted from the above, the reassembly modules 80 and 80A decode and reassemble the second data units received to form the original first data units. The second and extra second data units received are tracked to determine if a sufficient number have been received to recreate the original first data unit. If a sufficient number have not been received, retransmission can optionally be requested. If some second data units have been lost, then the reassembly modules can recreate or reconstruct the missing second data units. As noted above, this process depends upon the coding used and the overall strategy employed. Such decoding and error correction processes are well known to those versed in this art.

Once the required number of second data units has been received, their payloads are extracted and used to reconstruct the original first data unit from which the second data units were derived. This may be as simple as concatenating the payloads of the second data units to result in the reconstructed first data unit. However, as noted above regarding the decoding, the reconstruction process will depend upon the process used to segment or divide the original first data unit. Once the original first data unit is reconstructed, it can be forwarded to the appropriate interface communicating with the receiving endpoint.

Regarding the segmentation modules, these modules perform the task of segmenting or dividing the first data units and "repackaging" the segments into second data units. The segmentation modules also encode the extra second data units as discussed above. The second data units, both those derived from the first data unit and the extra second data units, are then passed on to the interface module, which communicates with the transport network. To facilitate the optional re-transmission of second data units, the segmentation module can also buffer second data units. As an example, if five first data units have been segmented into twenty second data units and five extra second data units, the segmentation module can buffer the last three sets of second data units corresponding to the last three first data units encoded. Thus, twelve second data units and three extra second data units would be buffered by the segmentation module.

The segmentation module can also be configured to transmit second data units in an interleaved manner, to spread the risk of losing multiple second data units across different segmented first data units. Thus, instead of sequentially sending groups of second data units such that each group corresponds to a single first data unit, second data units from different first data units can be interleaved with one another. To illustrate, it can be assumed that first data units A, B, and C are respectively segmented into second data units DU-A1, DU-A2, DU-A3; DU-B1, DU-B2, DU-B3; DU-C1, DU-C2, and DU-C3. Instead of sending these second data units grouped according to their respective first data units, they can be interleaved. If second data units are sent in groups of three data units, then the first group can be DU-A1, DU-B1, and DU-C1. Another group can be DU-A2, DU-B2, and DU-C2, and so on. Using this scheme, if a group is lost, then a whole first data unit is not lost—only one third of the three first data units is lost. Depending on the coding and strategy employed, this type of loss may be recoverable.

Figure 4:
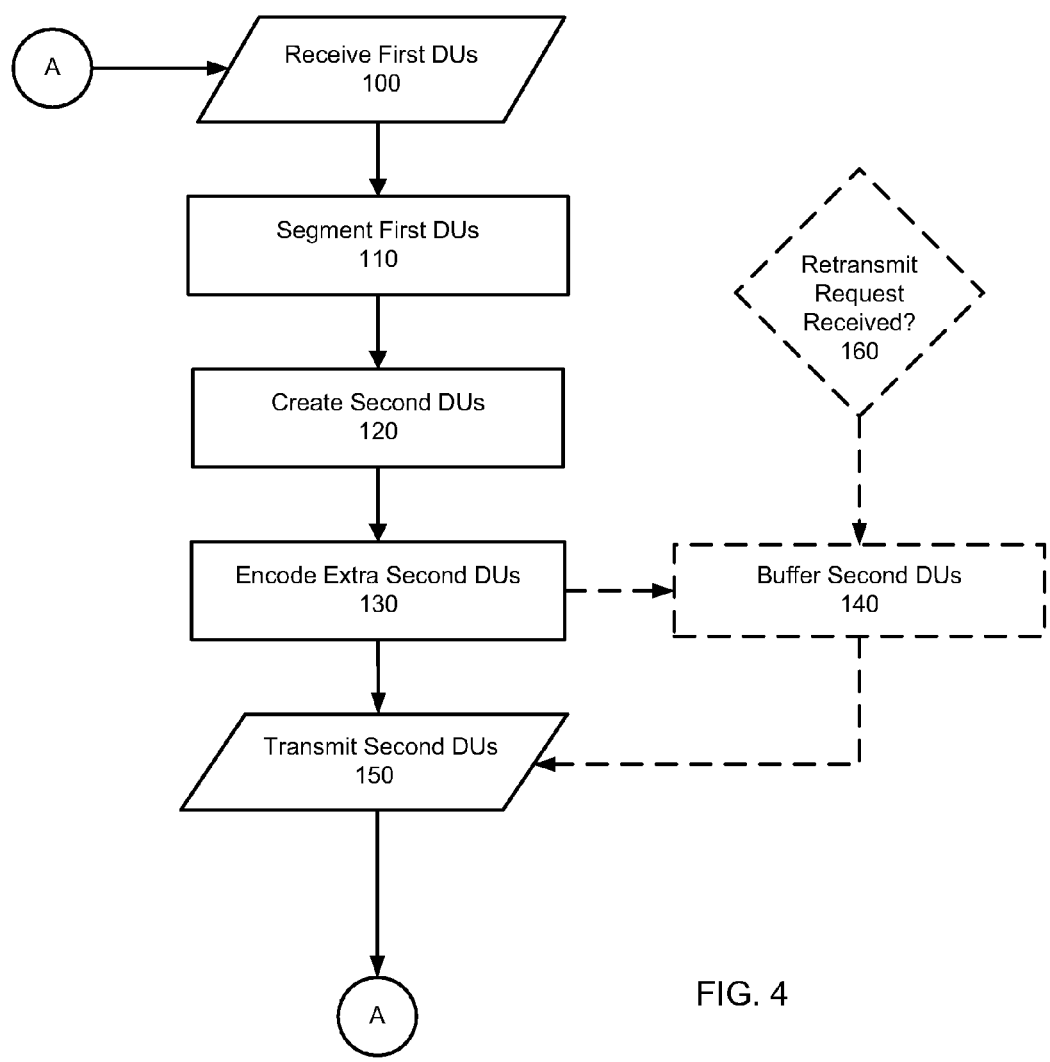
FIG. 4 is a flowchart illustrating the steps executed when first data units are received and transformed into second data units for transmission to the transport network.

An exemplary method according to the present invention, as implemented in one of encoding components 40 and 50, is shown in FIG. 4. The process begins, with step 100, by receiving a first data unit from the source endpoint. After being received, the first data unit is then divided or segmented (step 110) and the segments are packaged into second data units (step 120). Once the second data units are created, the extra or redundant second data units are encoded and created (step 130). The second data units can then be optionally buffered (step 140) and transmitted to the transport network (step 150). The method then returns to step 100 via connector A. If re-transmission is enabled, an optional check for a re-transmission request can be made (step 160) asynchronously. If such a request is received, then the decision flow returns to step 150, and the requested second data units, previously buffered in optional step 140, can be transmitted.

Figure 5:
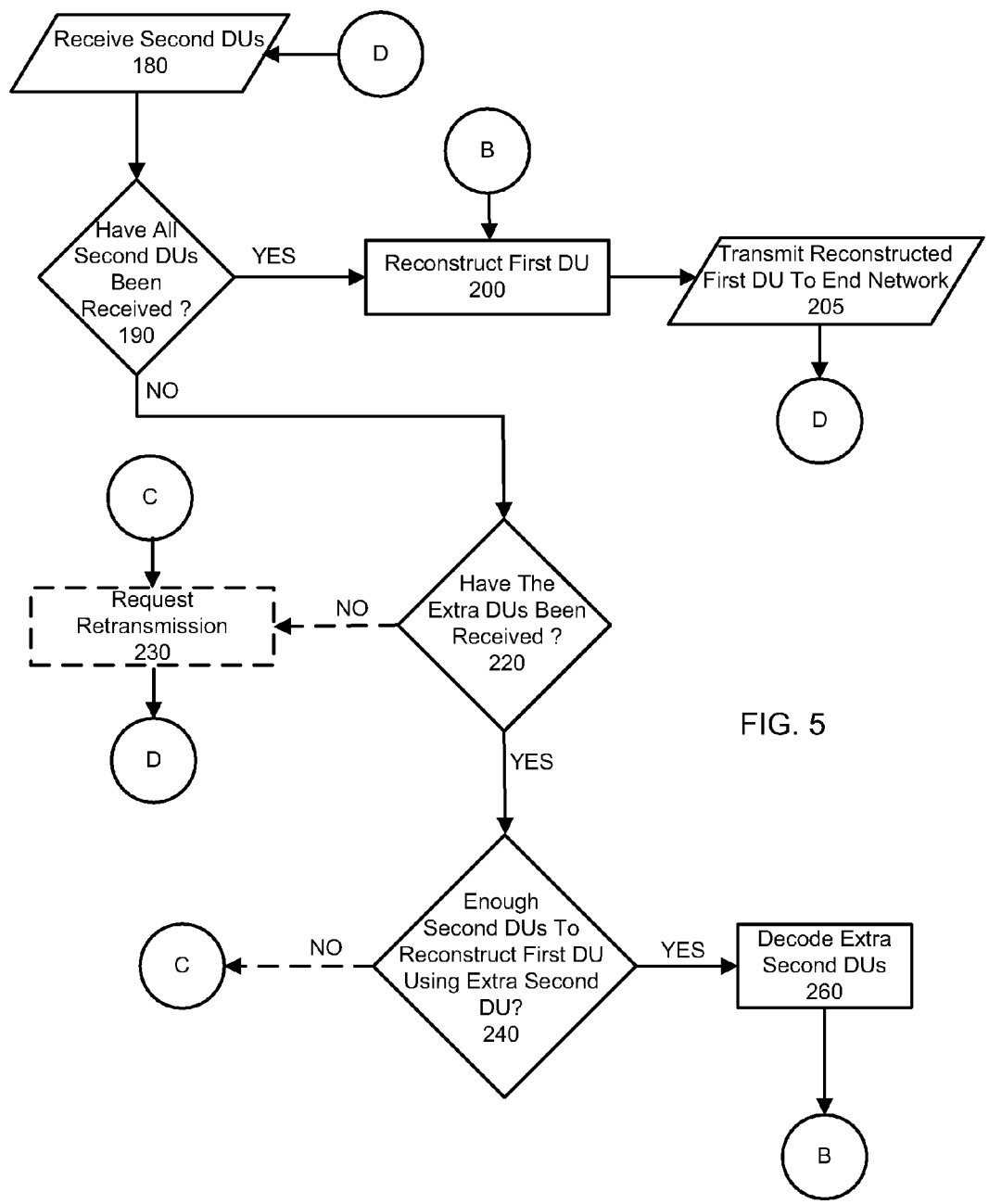
FIG. 5 is a flowchart illustrating the steps executed when second data units are received from the transport network and transformed into first data units for transmission to an end network.

FIG. 5 shows an exemplary embodiment of steps executed by an encoding component receiving second data units from the transport network. The process begins at step 180 as the server receives second data units from the transport network. Decision 190 then determines if all the second data units have been received to reconstruct the first data unit from which the second data units were derived. If all the second data units have been received, then the original first data unit is recreated at step 200. Once the first data unit have been recreated, the recreated data unit is transmitted to the destination endpoint (step 205) and the control flow moves back to step 180 by way of connector D.

Returning to decision 190, if not all the second data units have been received, then a decision is made to determine if extra second data units have been received (step 220). If no extra second data units have been received, re-transmission can be optionally requested (step 230). After the optional re-transmission request, the control flow returns to step 180 by way of connector D. If extra second data units have been received, decision 240 determines if sufficient extra second data units and second data units have been received to reconstruct the original first data unit. If an insufficient number have been received, the original packet can be dropped, or, optionally, the control flow can return, as indicated by connector C, to step 230: requesting a re-transmission. If a sufficient number of second data units and extra second data units have been received, then the extra second data units can be used to recreate or reconstruct the missing second data units (step 260). Connector B then returns the control flow to step 200.

Figure 6:
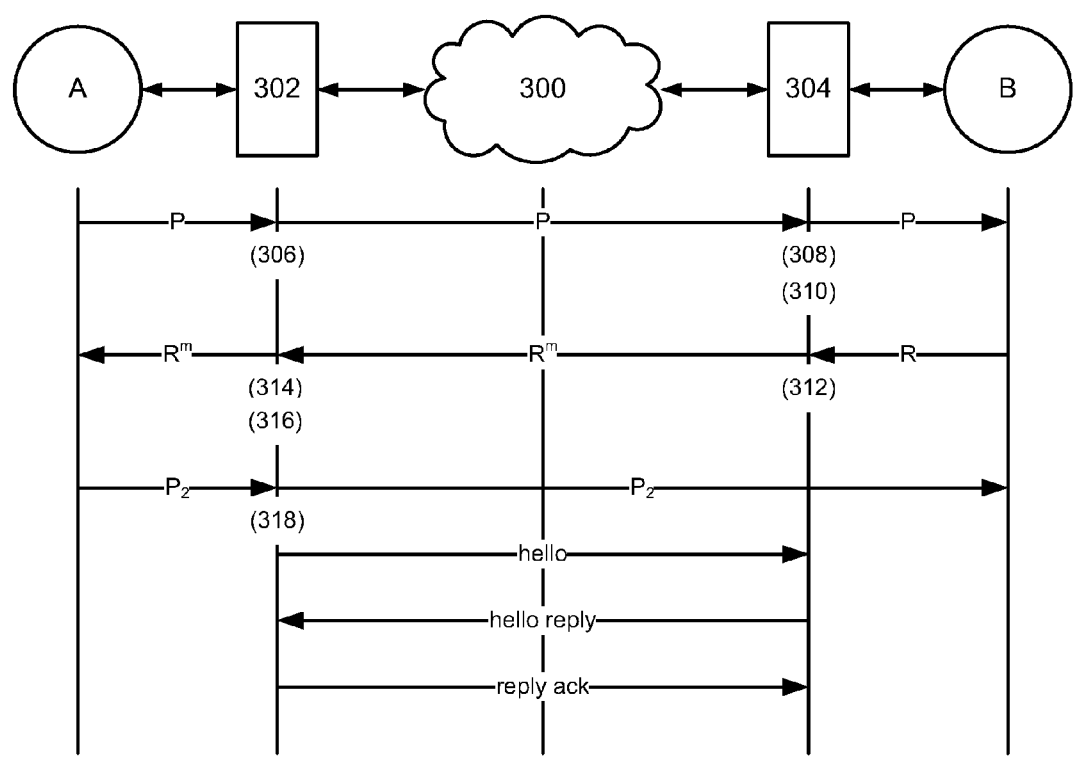
FIG. 6 illustrates an exemplary system and a connection negotiation protocol according to an embodiment of the present invention.

Some specific examples of implementation will aid in understanding the operation of the present system and method. FIG. 6 shows an exemplary system having endpoints A and B. Endpoint A communicates with a network 300, such as the Internet, through an encoding component 302. Endpoint B is also in communication with the network 300 through an encoding component 304. Encoding components 302 and 304 include the interfaces, segmentation and reassembly modules described in relation to FIGS. 2 and 3, and can be implemented wholly in software or can be implemented as pre-programmed hardware units, other related software, or as a combination of hardware and software components. An Ethernet, or other suitable connection, can be used to connect each endpoint to its respective encoding component.

For the purposes of this example, it is assumed that a bidirectional communication is occurring between endpoints A and B, and that endpoint A initiates the communication. The present communication protocol is invisible to both endpoints A and B; all functionality resides in the encoding components 302 and 304. To set up a session between endpoints A and B, and to determine if both endpoints are associated with encoding components to permit communication in accordance with the present protocol, the connection negotiation protocol illustrated in FIG. 6 can be used. Endpoint A sends a packet P destined to endpoint B. The packet P and its destination are detected or noticed (306) by encoding component 302, and encoding component 302 stores information uniquely identifying the communication session. Packet P is also detected or noticed (308) by encoding component 304. Encoding component 304 stores information uniquely identifying the communication session (310) related to the packet and sends the packet to endpoint B. When endpoint B sends a reply packet R to endpoint A, the reply packet R is intercepted by encoding component 304, matched with the previously stored information identifying the communication session and marked (312). The information uniquely identifying the communication session can be, for example, the source IP address, the destination IP address, the protocol contained within the IP packet (e.g. UDP or TCP), and the source and destination ports. For Ethernet frames, the VLAN ID can also be used.

The marked packet $R^m$ is used to signal to encoding component 302 that encoding component 304 is capable of receiving and sending packets segmented and encoded according to the present invention. Marking the packet can consist of, for example, setting an option in the IP header of the packet, and/or setting the IP identification field to a known value. Routers and other devices in the public network 300 may leave the IP identification field unchanged during transmission. Other suitable marking or signaling schemes, such as setting the IP address flag in the timestamp, can be used, provided that they are preferably non-destructive, and non-disruptive to devices that are not capable of communication in accordance with the present protocol.

Encoding component 304 then forwards the marked packet $R'''$ to endpoint A, via the public network 300. The marked packet $R'''$ is detected by encoding component 302, which updates the previously stored information identifying the communication session (316), and sends the packet to endpoint A. The encoding component 302 can optionally remove the mark prior to forwarding the packet to endpoint A. When endpoint A sends another packet $P_2$ destined to endpoint B, encoding component 302 matches (318) the packet $P_2$ with the previously stored information identifying the communication session. Recognizing that endpoint B is provided with an encoding component enabled to communicate in accordance with the present protocol, encoding component 302 sends a "hello" message in addition to forwarding the packet $P_2$.

On receipt of the "hello" message from encoding component 302, encoding component 304 replies with a "hello" reply. Encoding component 302 then sends a reply acknowledgment ("reply ack") to encoding component 304, and begins to segment and encode data packets destined for endpoint B using the present protocol. When component 304 receives the reply acknowledgment from component 302, it also begins to segment and encode data packets destined for endpoint A to provide the second data units previously described. The encoded channel between encoding component 302 and 304 is thus successfully automatically detected and negotiated. The encoded channel can be used to carry both data and control information. Once an encoded channel has been negotiated between two encoding components enabled to use the present protocol, segmented and/or encoded messages can now be sent and received. The encoded channel remains active until a predetermined timeout period has elapsed during which the encoding components fail to receive any further packets. Both sides then tear down the encoded channel. Other methods for negotiating the encoded channel between two endpoints are also contemplated. For example, the encoded channel can be negotiated through a pre-existing control channel between the endpoints to the communication.

It should be noted that all communication between the endpoints and the components 302 and 304 occurs over the established or existing communication channel. The channel can implement known communication protocols, such as Universal Datagram Protocol (UDP) and Transmission Control Protocol (TCP), both over IP. If the connection is a UDP connection, messages according to the present invention are inserted directly into the UDP data payload.

If sending data over an existing TCP connection, the original TCP header can be appended to each segment, with the sequence numbers modified. Thus, the source port and destination ports remain the same. The first segment is given the sequence number of the original packet, but subsequent segments are provided with new sequence numbers. In a presently preferred embodiment, an encoded or extra segment re-uses a sequence number of one of its related segments. This permits the extra segment to pass through firewalls in the same manner as would a re-transmitted packet. The data offset and checksum remain unchanged, but the flags, or control bits, are modified for all but the initial segment. For non-segmented messages (i.e. control messages), the remaining message bytes immediately follow the modified TCP header. For segmented messages, a segment payload follows the modified TCP header to provide, for example, identifying information, such as a serial number, to identify a segment and its relation to other segments, and to enable reassembly of the original packet. The data payload of the segment then follows.

As will be appreciated, a packet marked or created as described above will pass unchallenged through firewalls and Network Address Translation (NAT) translators. Effectively, the encoded channel establishes a control channel between the encoding components 302 and 304, and packets can pass from either end without being recognized or challenged by any intermediate component, such as a firewall or NAT.

Figure 7:
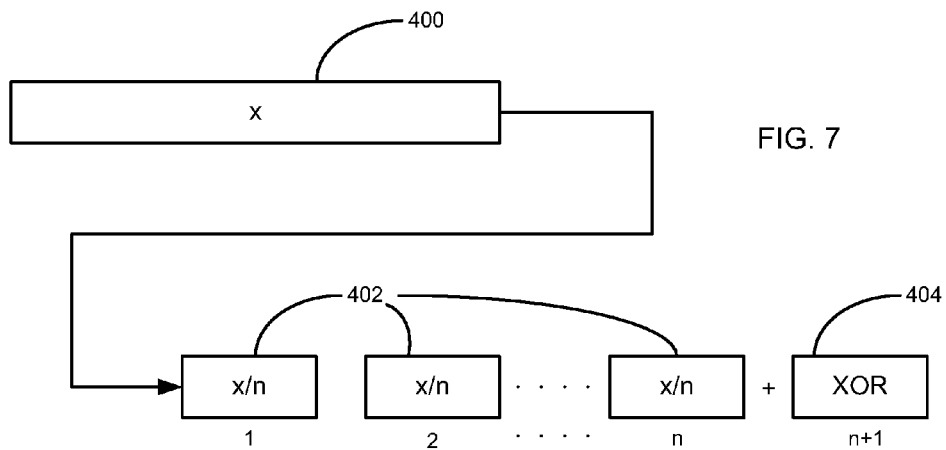
FIG. 7 illustrates a generic segmentation and encoding of a packet according to the present invention.

Segmentation and encoding of a packet according to an embodiment of the present invention will now be described with reference to FIG. 7. To simplify the discussion, headers have been omitted from the original packet and the segmented packets. An original data payload 400 is received at an encoding component according to the present invention. The original data payload has x bytes, and is segmented into n segments 402. Where n is chosen as an integer factor of x, each of the n segments will have x/n bytes, as shown. In addition, m additional segments are created. In the example shown in FIG. 7, m=1 and the additional or extra packet 404 is a parity segment created by applying an XOR function to one of the n segments.

Figure 8:
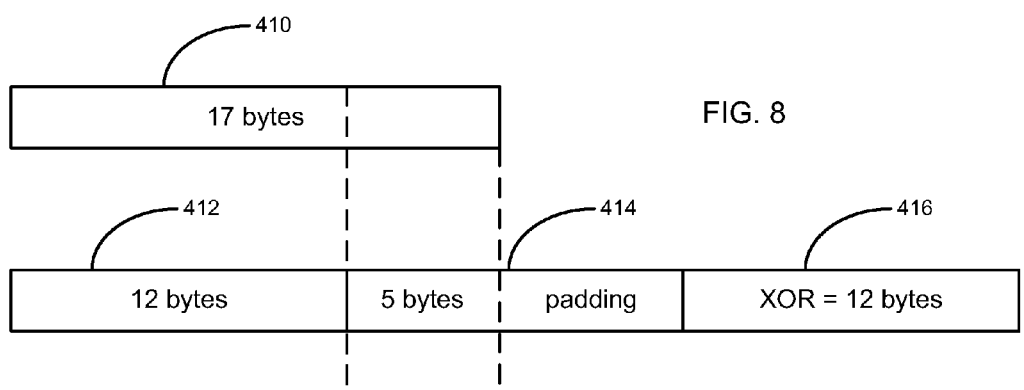
FIG. 8 shows an exemplary segmentation and encoding of a packet according to an embodiment of the present invention.

It may not always be possible or desirable to divide the original data payload 400 into even segments. For example, it may be necessary to pad the last segment to ensure all segments are of equal length where n is not a factor of x. For example, if x=17 and n=2, the nearest integer value to x/n is 9. Segment sizes that are factors of 4 or 8 are generally preferred, thus the segment size in this case is chosen to be the next factor of 4 greater than, or equal to x/n (e.g. 12 bytes). As shown in FIG. 8, the original 17 byte data payload 410 is segmented into two 12 byte segment payloads 412 and 414. Segment payload 412 contains the first 12 bytes of the original data payload 410, and segment payload 414 contains the remaining 5 bytes from the original data payload 410 optionally padded out to 12 bytes. A further extra segment 416, which is a parity segment of segment 412, forms the final segment in the sequence. It should be noted that all the segments related to a single original packet or frame have the same serial number to permit their identification and reassembly at the receiving end.

Figure 9:
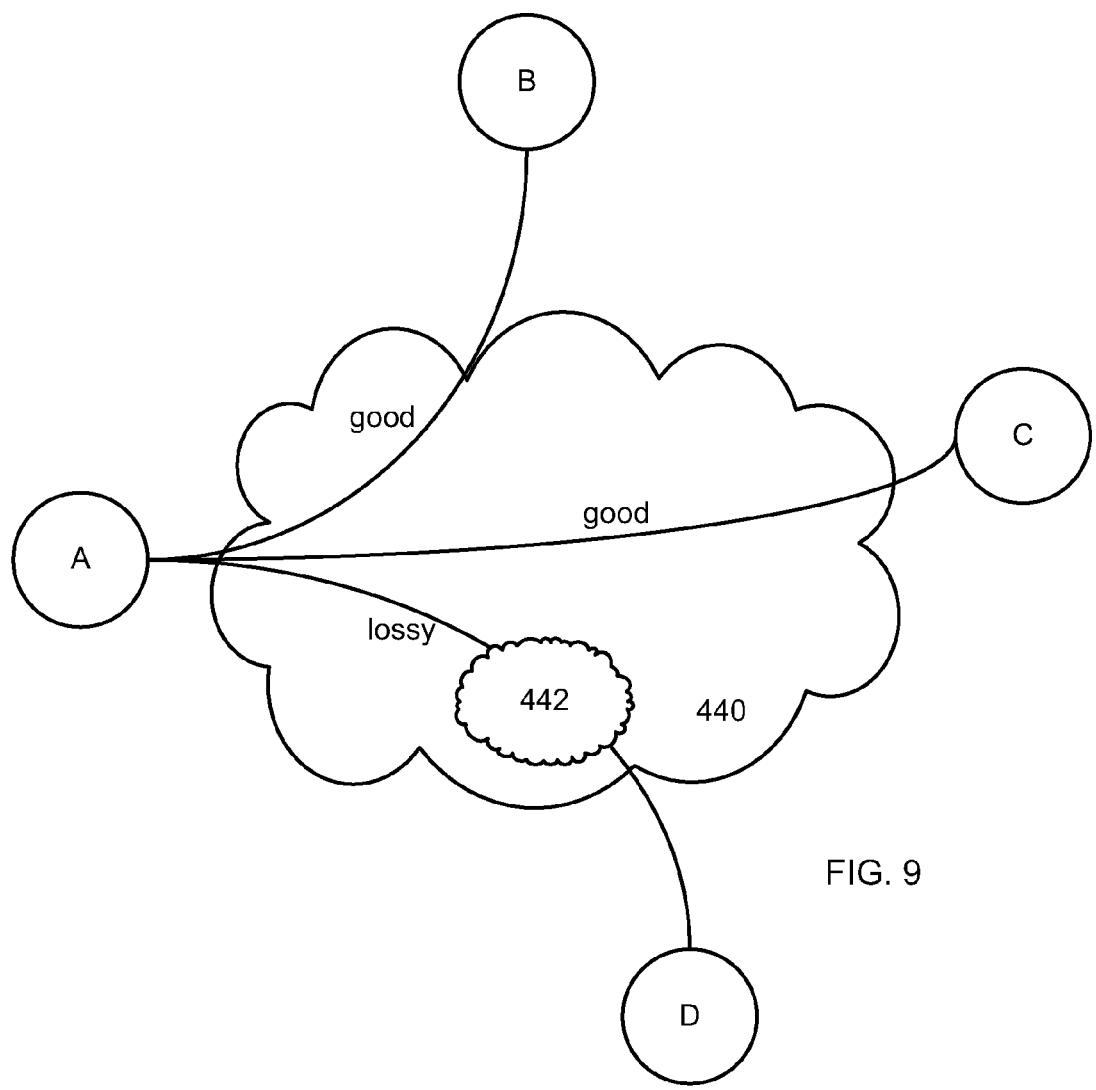
FIG. 9 shows an environment in which loss statistics can be determined.

The encoding rate is determined by both n and m. The encoding rate can be set to predetermined values (e.g. n=2, m=1 as shown in FIG. 8), or can be adjusted based on observed and/or reported network performance for all encoded channels terminating at an encoding component associated with a given endpoint. One method of determining network performance will now be described in relation to FIG. 9. In FIG. 9, endpoint A is communicating with endpoints B, C and D over a public network 440. Each of the endpoints is enabled to communicate according to the present protocol. The encoding component (not shown) associated with endpoint A continually monitors the losses it is experiencing in receiving segments from each of the other endpoints. The encoding component can monitor such losses by, for example, maintaining a count of the number of segments it has failed to receive, or by counting the number of resend requests it sends to each of the other endpoints during their respective sessions. A resend request can be sent by endpoint A whenever it detects excess missing segments in a sequence. Endpoint A can also receive details of observed network performance from endpoints B, C, and D. Applying such methods, endpoint A determines that the connections A-B and A-C are good, and are experiencing little loss. However, the collected performance statistics show that the connection A-D is lossy, and endpoint A is experiencing high loss from D. This likely means that there is a local pocket of loss 442 somewhere between A and D. Endpoint A reports to D that it is experiencing high loss from D, but low loss on average. This allows D to decrease or increase its encoding rate (i.e. decrease or increase n and/or m) to improve the chance that, despite the lossy channel, packets can be recovered at endpoint A from the received segments.

The examples described above generally relate to bidirectional communications between endpoints, where negotiation of the encoded channel is feasible and desirable. However, the present invention can also be used in substantially unidirectional, or streaming, applications to accelerate their performance, and in other applications where negotiating the connection between the encoding components is impractical or otherwise undesirale. In such applications, no negotiation is required between the encoding components associated with each endpoint. The encoded channel is established by recognizing call signaling messages, and subsequent deep packet analysis permits messages related to the communication session to be recognized.

For example, the encoding/decoding components of the present invention can be used to take advantage of the stateful nature of Real-Time Streaming Protocol (RTSP) to set up and monitor a connection for streaming. The default port for RTSP commands is port 554. Therefore, the encoding components of the present invention can analyze packet headers to determine if they are destined to, or originate from, the RTSP default port, and thereby identify RTSP packets. If a RTSP message is detected, the message can be parsed to determine if it contains a SETUP request, a SETUP response, a TEARDOWN request, or a general RTSP response. A SETUP request from a user contains the media stream URL and a local port for receiving RTP data (audio or video). The RTSP server reply confirms the chosen parameters, and provides the server's chosen ports. By parsing the reply from the RTSP server, the encoding components can determine the RTSP session identification assigned to the data stream, the RTSP sequence number for the message, and the RTP ports that have been allocated for the session by the user terminal and the RTSP server. In this way, an encoded channel for streaming can be set up between the encoding components. Subsequent data units between the client and server can then be analyzed, such as by deep packet analysis. If the ports match those set in the SETUP reply, the message can be intercepted for segmentation and encoding, or decoding and reassembly, as described above, without any negotiation to set up the encoded channel.

Similarly, for H.323, the encoding components can analyze packets for messages indicating an H.323 call is being set up. For example, the encoding components can detect and do a deep packet analysis on H.225/Q.931 call setup messages and/or H.245 negotiation and path setup messages to identify called and caller data ports that will be used for the associated H.323 session. An encoded channel according to the present protocol can then be set up to intercept and encode the data flow as described above.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of accelerating data communications between any of a plurality of endpoints over an unreliable IP network; comprising:
   providing encoding components associated with each of two endpoints to a communication;
   establishing a communication channel between the encoding components for a communication session between the endpoints;
   intercepting a first layer 3 or above data packet related to the communication at one of the encoding components;
   segmenting and packaging said first layer 3 or above data packet to provide two or more second layer 3 or above data segments for transmission to the other of the encoding components;
   transmitting the second layer 3 or above data segments and at least one extra second layer 3 or above segment to the other of the encoding components over the communication channel;
   decoding and reassembling the first layer 3 or above data packet at the other of the encoding components based on the received second layer 3 or above data segments; and
   transmitting the reassembled first layer 3 or above data packet from the other encoding components to its respective endpoint,
   wherein said segmenting and packaging further comprises:
      monitoring retransmission request metrics for each of a plurality of communication sessions;
      determining an average retransmission request metrics in accordance with the retransmission request metrics of each communication session; and
      communicating a retransmission request metrics of the communication session and the average retransmission request metrics to the other of the two endpoints to permit the other of the two endpoints to adjust its encoding rate.

2. The method of claim 1, wherein a number of second layer 3 or above data segments for transmission and a number of extra second layer 3 or above segment are determined based on encoding parameters.

3. The method of claim 1, wherein establishing the communication channel comprises:
   detecting a layer 3 or above data packet originating from a first of the two endpoints and destined to the other of the two endpoints;
   storing information uniquely identifying the communication session;
   marking the layer 3 or above data packet destined to the other endpoint to indicate that the first endpoint is enabled to segment and encode layer 3 or above data packets according to a protocol known to both encoding components;
   forwarding the marked messages to the other endpoint; and
   exchanging control messages to establish the communication channel between the encoding components.

4. The method of claim 3, wherein marking comprises setting an option in an Internet Protocol header of said layer 3 or above data packets.

5. The method of claim 3, wherein marking comprises setting an identification field of said layer 3 or above data packets to a known value.

6. The method of claim 3, further comprising tearing down the communication channel if no further layer 3 or above packets are transmitted within a predetermined timeout period.

7. The method of claim 3, wherein storing information uniquely identifying the communication session comprises storing a source IP address, a destination IP address, a protocol contained within the layer 3 or above packet, and source and destination ports.

8. The method of claim 1, wherein establishing the communication channel comprises:
   detecting a layer 3 or above data packet originating from a first of the two endpoints and destined to the other of the two endpoints;
   storing information uniquely identifying the communication session;
   determining if the layer 3 or above data packet is related to the communication session and has been marked to indicate that the other endpoint is enabled to segment and encode the layer 3 or above data packets according to a protocol known to both encoding components;
   transmitting control messages to establish the communication channel between the encoding components.

9. The method of claim 1, wherein establishing the communication channel comprises:
   detecting control messages of a known protocol establishing said communication session between two endpoints, the control messages including an identification of originating and destination ports; and
   creating the communication channel in response to the detected control messages.

10. The method of claim 9, wherein the communication session is a Real Time Streaming Protocol (RTSP) session.

11. The method of claim 9, wherein the communication session is a H.323 protocol session.

12. The method of claim 1, wherein establishing the communication channel comprises exchanging information over a pre-existing control channel established between the two endpoints.

13. The method of claim 1, wherein segmenting and packaging the layer 3 or above data packet comprises segmenting the layer 3 or above data packet into data segments in accordance with a predetermined encoding rate.

14. The method of claim 1, wherein segmenting and packaging the first layer 3 or above data packet comprises modifying a header of the layer 3 or above data packet and appending modified headers to each of the second layer 3 or above data segments.

15. The method of claim 14, wherein modifying the header comprises modifying a sequence number of a TCP header.

16. The method of claim 14, wherein modifying the header comprises modifying TCP header flags.

17. The method of claim 14, wherein modifying the header comprises modifying the urgent pointer in a TCP header.

18. The method of claim 1, wherein segmenting and packaging the first layer 3 or above data packet comprises adding identifying information to each layer 3 or above data segment.

19. The method of claim 1, wherein said at least one extra second segment includes a parity code.

20. The method of claim 1, wherein said at least one extra second segment is a copy of said encoded data segments.

21. The method of claim 1, wherein said second data segments are of same size.

22. The method of claim 1, wherein the number of said second data segments is a multiple of 4.

23. An apparatus for accelerating data communications between two endpoints over an unreliable IP network, the apparatus comprising:
   an endpoint interface in communication with a first endpoint, the endpoint interface intercepting a first data packet received from the first endpoint, the first data packet related to a communication session established between the first endpoint and a second endpoint;
   a segmentation module coupled to the endpoint interface and a network interface, the segmentation module receiving the first data packet from the endpoint interface and segmenting and packaging the first data packet to provide a first plurality of data segments to the network interface, the segmentation module also providing a first extra segment to the network interface,
   wherein the segmentation module monitors retransmission request metrics for the communication session and determines an average retransmission request metrics in accordance with the retransmission request metrics of a plurality of communication sessions, the segmentation module communicating the retransmission request metrics of the communication session and the average retransmission request metrics to the first endpoint to permit the first endpoint to adjust its encoding rate;
   the network interface transmitting the first plurality of data segments and the first extra segment over the unreliable IP network to the second endpoint, the second endpoint in communication with the network interface over the unreliable IP network;
   the network interface receiving a second plurality of data segments and a second extra segment from the unreliable IP network, the second plurality of data segments and the second extra segment associated with the communication session;
   a reassembly module coupled to the network interface and the endpoint interface, the reassembly module receiving the second plurality of data segments and the second extra segment from the network interface and decoding and reassembling a second data packet based on the received second plurality of data segments and the second extra segment;
   the endpoint interface receiving the second data packet from the reassembly module to transmit it to the first endpoint;

wherein the first data packet, the second data packet, the first plurality of data segments, the second plurality of data segments, the first extra segment, and the second extra segment all use layer 3 or above protocols.

24. The apparatus of claim 23, wherein the communication session is established by exchanging information over a pre-existing control channel established between the first endpoint and the second endpoint.

25. The apparatus of claim 23, wherein the segmentation module segments and packages the first data packet into the first plurality of data segments using a predetermined encoding rate.

26. The apparatus of claim 23, wherein the segmentation module modifies a header of the first data packet and appends modified headers to each of the first plurality of data segments.

27. The apparatus of claim 23, wherein segmentation module adds identifying information to each of the first plurality of data segments.

28. The apparatus of claim 23, wherein the reassembly module generates retransmission requests for the second plurality of data segments when it is unable to decode and reassemble the second data packet due to errors resulting in lost segments of the second plurality of data segments or the second extra segment.

* * * * *